(12) United States Patent
Labenski et al.

(10) Patent No.: US 10,977,333 B2
(45) Date of Patent: Apr. 13, 2021

(54) LINK CORRECTIONS BY COGNITIVE ANALYSIS OF WEB RESOURCES

(71) Applicant: International Business Machines Corporation, Armonk, NY (US)

(72) Inventors: Marcin Labenski, Cracow (PL); Grzegorz Sawina, Cracow (PL); Tomasz A. Stopa, Cracow (PL); Joanna Barbara Koza, Proszowice (PL)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 16/139,697

(22) Filed: Sep. 24, 2018

(65) Prior Publication Data
US 2020/0097517 A1 Mar. 26, 2020

(51) Int. Cl.
*G06F 16/955* (2019.01)
*G06F 16/957* (2019.01)
*G06F 16/958* (2019.01)
*G06F 16/25* (2019.01)
*H04L 29/08* (2006.01)

(52) U.S. Cl.
CPC ........ *G06F 16/9566* (2019.01); *G06F 16/252* (2019.01); *G06F 16/957* (2019.01); *G06F 16/972* (2019.01); *H04L 67/02* (2013.01)

(58) Field of Classification Search
CPC .......................... G06F 16/972; G06F 16/9566
See application file for complete search history.

(56) References Cited

U.S. PATENT DOCUMENTS

| | | | |
|---|---|---|---|
| 6,981,210 B2 | 12/2005 | Peters et al. | |
| 7,853,719 B1 * | 12/2010 | Cao | G06F 16/9566 709/245 |
| 7,970,874 B2 | 6/2011 | Kale et al. | |
| 8,359,294 B2 | 1/2013 | Ohshima | |
| 9,800,727 B1 * | 10/2017 | Chakrabarty | H04M 3/5191 |
| 2003/0110295 A1 | 6/2003 | Suzuki et al. | |
| 2011/0252329 A1 * | 10/2011 | Broman | G06F 16/9535 715/738 |
| 2013/0124755 A1 | 5/2013 | Haywood et al. | |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Scott T Baderman
*Assistant Examiner* — Seung Woon Jung
(74) *Attorney, Agent, or Firm* — Law Office of Jim Boice (57) ABSTRACT

A method retrieves and displays an alternative webpage in response to an initially-requested webpage no longer being available. A browser on a client device sends a request to a web server for an original webpage, which is associated with an original Universal Resource Locator (URL). The browser receives an error response, from the web server, which indicates that the original webpage no longer exists. A search engine on the client device searches for multiple alternative Universal Resource Locators (URLs), which are based on variations from the original URL. An alternative webpage that is associated with one of the multiple alternative URLs is then displayed on the client device.

20 Claims, 8 Drawing Sheets

(56) References Cited

U.S. PATENT DOCUMENTS

| | | |
|---|---|---|
| 2015/0207660 A1 | 7/2015 | Sundaram et al. |
| 2015/0381699 A1* | 12/2015 | Eastham ............. G06F 16/9566 709/203 |
| 2016/0292207 A1* | 10/2016 | Watanabe ............. G06F 16/958 |
| 2017/0026393 A1* | 1/2017 | Walsh ................... G06F 21/128 |
| 2017/0295202 A1 | 10/2017 | Aharon |

OTHER PUBLICATIONS

D. Tiong, "Redirect Old Website Pages to New Website Pages", www.davidtiong.com, May 14, 2013, pp. 12.

Anonymous, "Change Page URLS With 301 Redirects", support.google.com, Retrieved Feb. 14, 2018, pp. 1-2.

* cited by examiner

LINK CORRECTIONS BY COGNITIVE ANALYSIS OF WEB RESOURCES

BACKGROUND

The present invention relates to the World Wide Web (WWW), and specifically to retrieving webpages from the WWW. Still more specifically, the present invention relates to finding and retrieving alternative webpages from the WWW in response to an initially-requested webpage no longer being available.

Most browsers include the ability to "bookmark" a webpage for future retrieval. That is, a bookmark is a tab, dropdown option, etc. that is linked to a webpage that a user has determined that he/she will want to visit again in the future. By clicking on the tab, dropdown option, etc., the browser automatically retrieves the webpage that is associated with the Uniform Resource Identifier/Locator (URI/L) that is associated with the bookmark.

SUMMARY

In one or more embodiments of the present invention, a method retrieves and displays an alternative webpage in response to an initially-requested webpage no longer being available. A browser on a client device sends a request to a web server for an original webpage, which is associated with an original Universal Resource Locator (URL). The browser receives an error response, from the web server, which indicates that the original webpage no longer exists. A search engine on the client device searches for multiple alternative Universal Resource Locators (URLs), which are based on variations from the original URL. An alternative webpage that is associated with one of the multiple alternative URLs is then displayed on the client device.

In other embodiments, the present invention as described in the method is implemented in a computer system and/or as a computer program product.

DETAILED DESCRIPTION

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connects to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, directs a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

Figure 1:
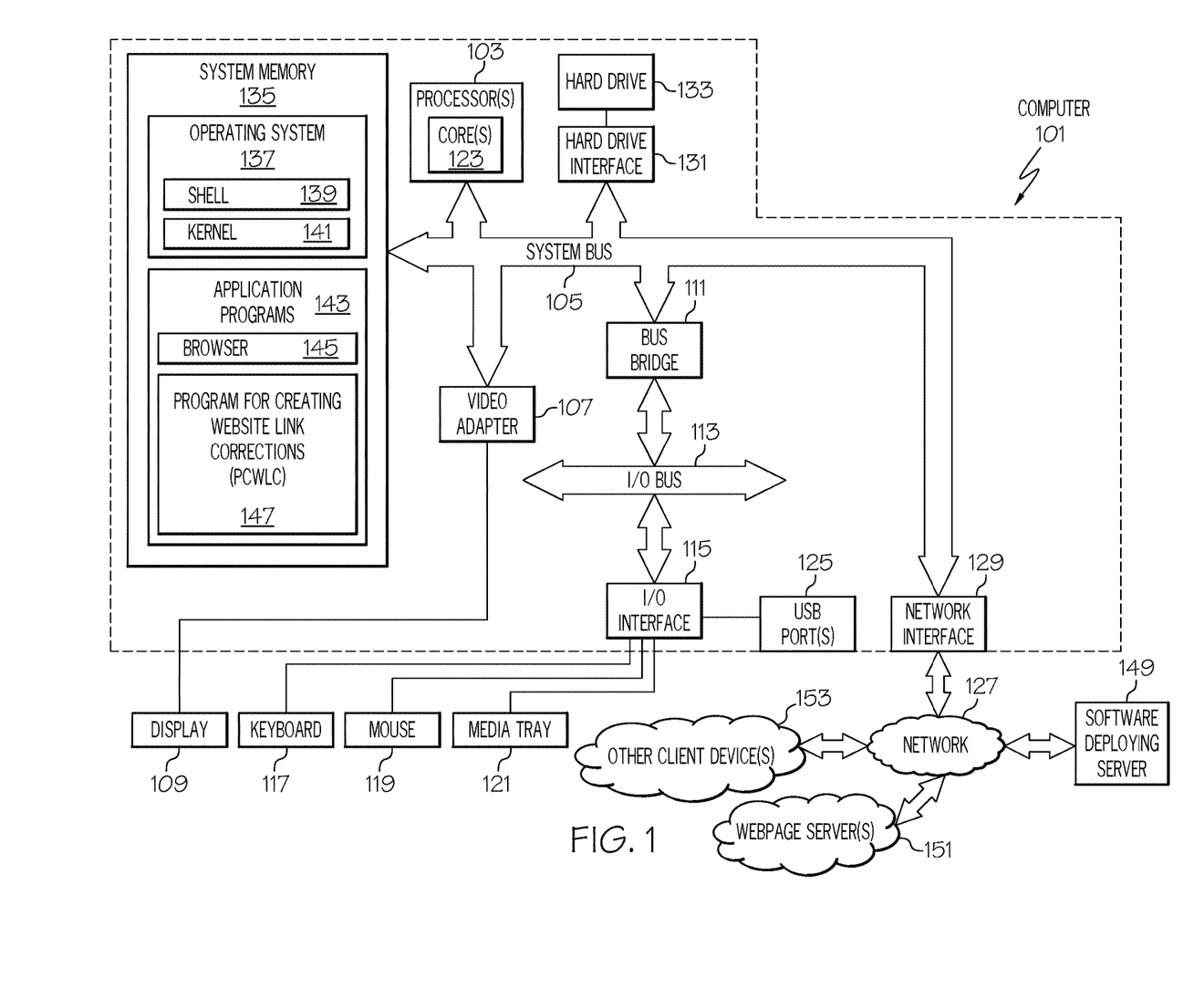
FIG. 1 depicts an exemplary system and network that is used in one or more embodiments of the present invention.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 utilized by software deploying server 149 and/or webpage server(s) 151 and/or other client device(s) 153 shown in FIG. 1.

In accordance with various embodiments of the present invention, other client device(s) 153 are one or more of a desktop computer, a laptop computer, a tablet computer, a smart phone, a personal digital assistant (PDA), and/or any other electronic device that is capable of performing the processes described herein by a "client device", including but not limited to browsing for and/or opening and displaying webpages. That is, a "client device" is defined as a processor-based device that is capable of browsing and retrieving webpages, and is either a non-mobile device (e.g., a desktop computer) or a mobile device (e.g., a smart cellular phone).

In one or more embodiments of the present invention, exemplary computer 101 includes a processor 103 that is coupled to a system bus 105. Processor 103 utilizes one or more processors, each of which has one or more processor cores 123. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. While the format of the ports connected to I/O interface 115 is that which is known to those skilled in the art of computer architecture, including but not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 also include a search engine 146, which is different from the browser 145. That is, the browser 145 allows the client 101 to retrieve webpages in response to a uniform resource locator (URL) being entered into the browser 145. If the user does not know what URL is, or even what webpages are available that are relevant to a particular topic, then the search engine 146 searches the WWW looking for text, metadata, etc. that identifies the subject matter of various webpages, and then returns them to the user for his/her selection and/or use.

Application programs 143 in computer 101's system memory (as well as software deploying server 149's system memory) also include a Program for Creating Website Link Corrections (PCWLC) 147. PCWLC includes code for implementing the processes described below, including those described in FIGS. 2-6. In one embodiment, computer 101 is able to download PCWLC 147 from software deploying server 149, including in an on-demand basis, wherein the code in PCWLC 147 is not downloaded until needed for execution. In one embodiment of the present invention, software deploying server 149 performs all of the functions associated with the present invention (including execution of PCWLC 147), thus freeing computer 101 from having to use its own internal computing resources to execute PCWLC 147.

The hardware elements depicted in computer 101 are not intended to be exhaustive, but rather are representative to highlight essential components required by the present invention. For instance, in one or more embodiments computer 101 includes alternative memory storage devices such as magnetic cassettes, digital versatile disks (DVDs), Bernoulli cartridges, and the like. These and other variations are intended to be within the spirit and scope of the present invention.

As described herein, users often have bookmarked links that they use rarely, such as links to software documentation, file downloads, etc. In many cases, when a user tries to access a particular link after an extended period of time, it turns out that particular link no longer exists. For example, if there is a new version of a particular software application or a new version of file for download is available, the link to the previous versions are often "taken down" from the World Wide Web (WWW) by the publisher, since the file is now outdated. In such cases, the user needs to find the new updated/correct link, but usually fails to do so if the publisher has not provided some type of mechanism that automatically redirects the user to the new link/website.

Thus, the present invention provides an automated solution to resolve such cases in a manner that 1) does not require the publisher to provide a redirecting link, 2) does not require the use of a lookup table to find the new link, and 3) is seamless for the user.

That is, in one or more embodiments of the present invention, a user enters a link in browser which was working in the past, but has become non-working because the link/resource has been moved or replaced. That is, the original link no longer works. The present invention solves this problem by having the browser user a cognitive approach to find and automatically redirect the user to the correct existing resource/link. This is a seamless experience for users thanks to the underlying logic.

As such, if the link does not work, then the browser (in a manner that is invisible to the user) uses a search engine to search for the new link. In one embodiment of the present invention, this new link is identified by monitoring other users who try other links to find the new resource. When the other users find the new resource, and then post a message to other browsers that a new link is proper, then the other browsers can find the new resource.

For example, assume that a user of one of the other client device(s) 153 show in FIG. 1 tried to open a website, but received an error message from one or more of the webpage server(s) 151 indicating that the website is no longer available. Assume now that another user tried other uniform resource locator (URL) links until he/she found an updated version of the information found in the website associated with the original URL link that he/she tried. The other user then sends a message to computer 101 (e.g., which is on a list of computers that share updated URL information among themselves) stating that the updated version of the URL now replaces the original version of the URL. Such a process is dynamic, since other client device(s) 153 are continuously updating which URL is the most current.

However, a preferred embodiment of the present invention uses only the browser 145 and search engine 146 within the computer 101 to dynamically determine which URL is associated with the latest version of the resource.

More specifically, search engine 146 is instrumented to look for alternative links that are similar to the original link entered by the user and are still active. These alternative links exist together with their confidence levels (similarity levels).

If the confidence level is high (i.e., a configurable value based on a similarity between the original URL and the alternative URL as described here) for at least one result, and the confidence levels for all the other alternative URLs are significantly lower (e.g., below some predetermined level), then the browser automatically displays the alternative webpage with the highest confidence level as the most probable match for the desired web resource.

In the scenario just described in which a most likely webpage is identified, the browser presents an indication on the GUI that informs the user that the webpage being displayed is not exactly from the requested link by a visual or text indicator. For example, in an embodiment of the present invention the browser color codes a border of the returned webpage that indicates that this is an alternative webpage, not the original webpage that was requested by the user.

If there are multiple results with a same or similar confidence level (another configurable value), then the browser does not automatically display the alternative webpage, but rather displays multiple high probability links for the user to choose from. Upon the user selecting a particular alternative webpage, the present invention will optionally color code the returned webpage in order to indicate that it is an alternative to the original webpage that was requested by the user.

In one or more embodiments of the present invention, instrumenting the search engine 146 to look for alternative links that are similar to the original link entered by the user is achieved by the following process.

First, the system (e.g., executing PCWLC 147 shown in FIG. 1) finds parts of the original link (i.e., the URL that is entered into the browser by the user) that can be treated as sequences, such as dates, versions, numbers, name of the month, etc.

Second, if links differing only in earlier identified sequences exist, then they are considered to be possible hits. For example, if an original URL was www.helpforprogramA/version1.0.com, and the search engine 146 found a URL that is www.helpforprogramA/version2.0.com, then the system determines that www.helpforprogramA/version2.0.com is an alternative version that replaces www.helpforprogramA/version1.0.com.

A confidence level of each identified URL/link/webpage is then determined.

In one embodiment of the present invention, this confidence level is based on alternative URLs that are selected/used by other users who were requesting the same original URL that the current user tried (unsuccessfully) to use. That is, if users of other client device(s) 153 found an alternative URL to the original URL currently being tried by the current user (e.g., by using one or more features of the present invention described herein), then the search engine will use that alternative URL in place of the original URL.

In an embodiment of the present invention, this confidence level is based on changes in sequences being as close to the requested values as possible. For example, assume that the original URL was www.originalURLabcd.com, and a potential alternative URL is www.originalURLabc1.com. Since these two URLs only differ by one character ("d" versus "1"), then www.originalURLabc1.com is rated highly as an alternative URL for www.originalURLabcd.com. Similarly, if www.originalURLabc1.com has a potential alternative URL of www.originalURLabc2.com, then it too is also rated highly (since the only replacement is "2" for "1"). Thus, in an embodiment of the present invention the changes are sequential (i.e., "2" instead of "1", as just described), or alternatively are unrelated to a sequence (e.g., "d" instead of "1", as just described).

Once the alternative link is identified by the search engine, then the content of the webpage associated with newly proposed alternative link is analyzed (e.g., using a text analysis of content in the new webpage, examining metadata associated with the new webpage, etc.). That is, the search engine will cache text and/or metadata from the old (and now non-working) webpage, and will compare that cached text/metadata to the text/metadata associated with the new webpage. If the two sets of text/metadata match within a predefined limit (e.g., within 95%), then the new webpage is determined to be an appropriate alternative webpage to the original webpage.

Thus, one or more embodiments of the present invention can be based on the following steps.

Initially, browser 145 receives the first hyperlink and tries to retrieve the original webpage that is associated with that first hyperlink. However, since the first hyperlink is no longer functional (i.e., the first webpage has been taken off the web), then no webpage is initially returned to the browser 145.

Since the first hyperlink did not work, the system (e.g., computer 101 executing PCWLC 147) converts at least one portion of the first hyperlink into a query that includes at least one search term derived from the first hyperlink. That is, the system develops a query to search for another hyperlink that includes as much of the first hyperlink as it can find.

The system then submits this query to search engine 146.

The search engine 146 then receives a search result associated with the query. This search result includes one or more second hyperlinks that have the potential of being an alternative hyperlink to the first hyperlink.

Next, the search engine 146 accesses a list of categories (e.g., version number, date, etc.) to identify in the first hyperlink, and tokenizes the first hyperlink to identify one or more literals falling into any of the categories. That is, the search engine 146 identifies any literal (e.g., date, version number, etc.) in a candidate URL that is in the same category as a literal found in the original URL.

The search engine 146 compares the tokenized first hyperlink with the search result and selects those second hyperlinks within the search result that differ only in the identified literals. For example, if the only difference between the two URLs is a date or version number, then they are likely closely related.

The search engine 146 then calculates, for each selected second hyperlink, a confidence level denoting a degree of similarity between the first hyperlink and the selected second hyperlink, such that closer values of the differing literals represent a higher score. Furthermore, the score decreases with the number of differing literals. That is, if the original URL and a candidate URL only differ in their literals for a date of the URL, then those two URLs are deemed to be closer (and thus the candidate URL has a higher confidence level) that if another candidate URL differs in the date literal, version literal, and author literal found in the original URL.

If the system identifies a second hyperlink that is closer to the first hyperlink than any other candidate hyperlink by a wide margin (e.g., the second hyperlink's literals have a 95% match to the first hyperlink's literals while the next closest candidate hyperlink's literal only have a 50% match to the first hyperlink's literals), then the second hyperlink is automatically selected as the replacement hyperlink to the first hyperlink (and thus the webpage associated with that second hyperlink automatically populates the GUI used by the user). However, if the literals from multiple candidate hyperlinks are all close to the literals in the first hyperlink (e.g., five hyperlinks all have a same level of similarity in their literals to the literals in the first hyperlink), then these multiple candidate hyperlinks are displayed to the user for his/her selection.

That is, since only one search result has the highest confidence level, the browser simply displays the web resource from that hyperlink.

In another embodiment, a required confidence threshold can be set in the browser. For example, if the required threshold in the browser is set to 85% (e.g., an 85% match to the first hyperlink's literals) and only a single candidate hyperlink meets or exceeds the 85% threshold, then that candidate hyperlink is selected and the alternative webpage is automatically displayed. However, if no matches meet the predetermined confidence threshold, then the browser will not automatically display an alternate URL, but will present ordered search results on the display. Similarly, if more than one link is found with a very high confidence level (e.g. a confidence level of 90%), the links will be presented as ordered search results, since there is not a unique URL to display.

In an embodiment of the present invention, the process described above is performed (and the webpage evaluated) only if the old (original) webpage is cached by the search engine. However, if the webpage is not in cache, no content comparison will be used in verifying an alternative webpage that has been found.

To reiterate, various features found in one or more embodiments of the present invention can be described according to the following nine steps.

Step 1. The search engine 146, searches for hyperlinks that are similar to an original hyperlink that failed, due to the underlying webpage/website being removed from the web.

Step 2. Search engine 146 searches for variations of the original hyperlink and receives several results, which constitute an intermediate output.

Step 3. Search engine 146 uses this intermediate output to compare them to a list of literal types of interest that will identify an optimal alternative hyperlink to the original hyperlink. Exemplary literal types of interest are cardinal numbers, numbers of the form x.y.z.w, dates, literals from a set such as (v1, v2, v3, . . . ), names of the months, names of the week, names of days, etc.

Step 4. Search engine 146 tokenizes the input link to identify all the literals falling into the categories identified in Step 3.

Step 5. Search engine 146 compares the results of from Step 4 with the intermediate results from Step 2 and searches for all the hits from intermediate results which differ only in the literals identified in Step 3 (such that all the rest of the tokens are the same). That is, only the identified/selected literals/tokens differ, while the rest of the literals/tokens in both the original URL and the candidate URL are the same.

Stop 6. From the filtered intermediate hits in Step 5, search engine 146 calculates a confidence level denoting the candidate hyperlink's similarity to the initial hyperlink. Hyperlinks having closer values of the differing literals have a higher confidence level For example, if the initial link contained the literal "January", then a candidate hyperlink having the literal "March" has a better/higher confidence score than a candidate hyperlink that has the literal "December". Furthermore, the fewer categories of literals that differ, the higher the confidence level.

Step 7. If only one hit from Step 5 has a highest score (e.g., more than a 95% match between literals in the original URL and the candidate URL), then the search engine returns just this hit (hyperlink) as the final output.

Step 8. If Step 7 is true, then browser 145 displays the web resource under the identified alternative hyperlink.

Step 9. If the search engine 146 returns more than one candidate hyperlink, then these candidate hyperlinks are sorted from the highest score. Then browser 145 then displays the result links for the user to select from, rather than automatically returning another webpage to the user. The user selects which candidate hyperlink to use, and the webpage is then retrieved by the browser 145.

Figure 2:
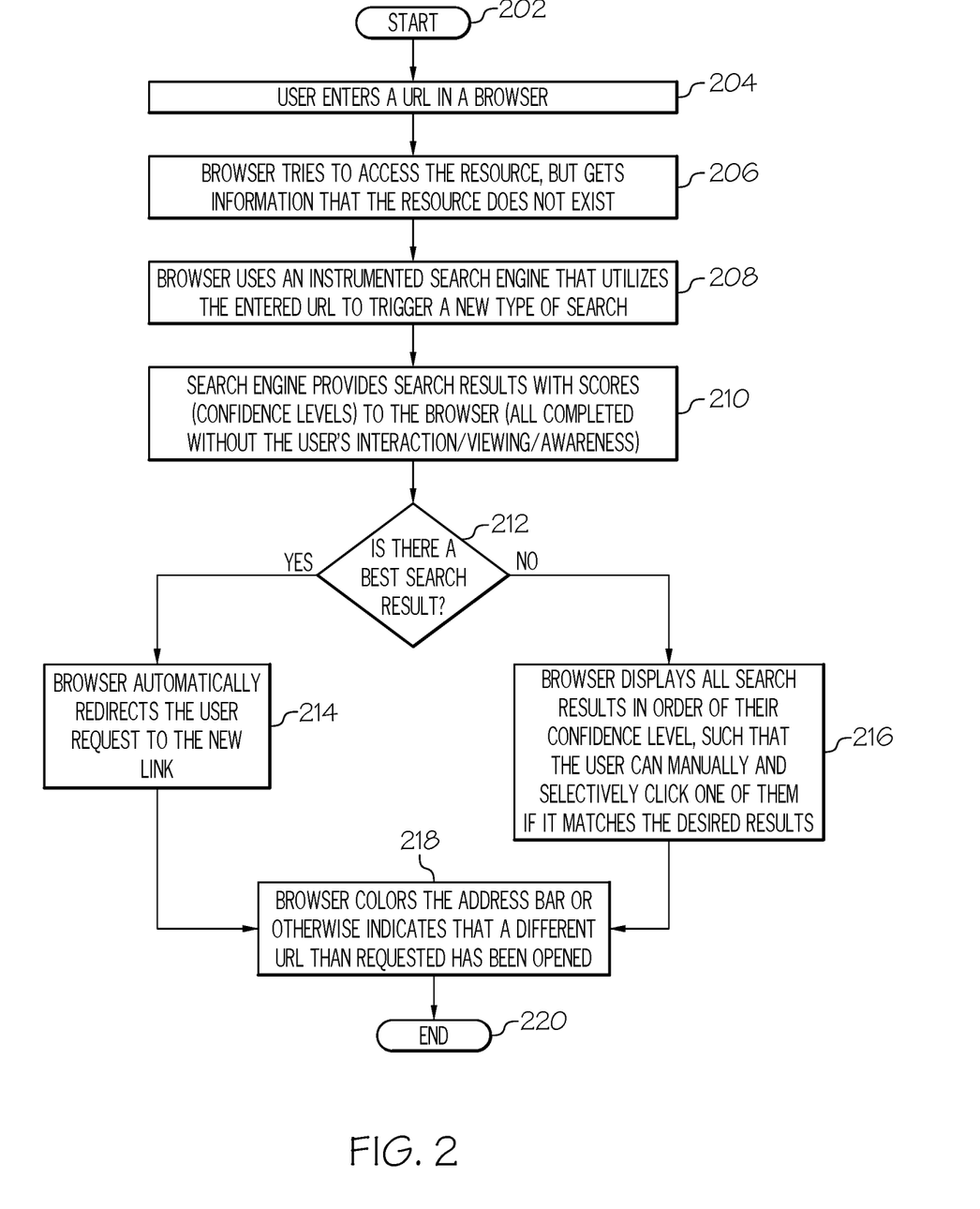
FIG. 2 illustrates a high-level flow-chart describing of one or more embodiments of the present invention.

With reference now to FIG. 2, a high-level flow-chart describing one or more embodiments of the present invention is presented.

After initiator block 202, a user enters a URL in a browser (block 204). In various embodiments of the present invention, this entry is performed by clicking a "bookmark" tab, typing in the URL into a browser's input field, etc.

As shown in block 206, the browser tries to access the resource (e.g., webpage) that is associated with the entered original URL, but gets a message that the webpage is no longer available.

As shown in block 208, the browser, (i.e., in a manner that is not visible to the user) uses an instrumented search engine that utilizes the entered URL to trigger a new type of search. That is, the search engine is instrumented to search for another URL that is the same as the original (failed) URL except for varying in certain predefined literals (e.g., version number, date, etc.).

As shown in block 210, the instrumented search engine 1) provides these intermediate (candidate) URLs, and 2) ranks them (according to how closely they match the original URL). Again, all of this is invisible to the user.

As shown in query block 212, a determination is made as to whether there is a single candidate URL that is much closer than any other candidate URL to the original (failed) URL. If so, then the browser automatically redirects the user request to the new link/hyperlink/URL, which causes the new webpage to be displayed (block 214).

However, if there is no clear "winner" among the candidate URLs (query block 212), then the confidence level (i.e., how closely the original URL and each candidate URL match one another's literals) for each of the candidate URLs is established, and these ranked URLs are displayed to the user for his/her selection (block 216).

As shown in block 218, in one or more embodiments of the present invention the alternative webpage that is retrieved is visually coded (e.g., by coloring the address bar, providing a distinctive border around the webpage, etc.) in order to indicate that an alternative webpage is being rendered (since the original webpage is not available).

The flow chart ends at terminator block 220.

Figure 3:
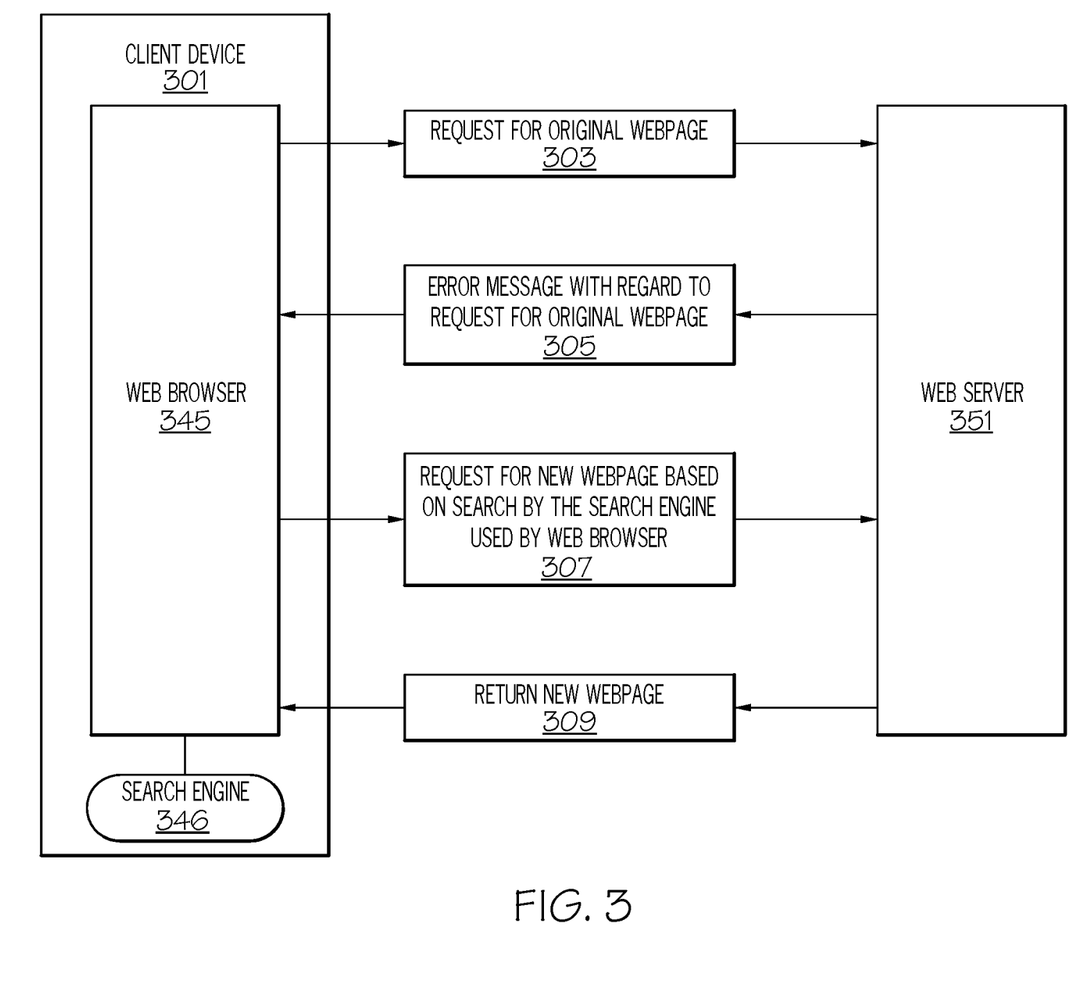
FIG. 3 depicts an exemplary network architecture used in one or more embodiments of the present invention.

With reference now to FIG. 3, an exemplary network architecture 300 used in one or more embodiments of the present invention is presented.

A client device 301 (analogous to computer 101 shown in FIG. 1) has a web browser 345 (analogous to browser 145 shown in FIG. 1), which has access to a search engine 346 (analogous to search engine 146 shown in FIG. 1).

As shown in block 303, the web browser 345 has used a first hyperlink to request an original webpage 303 from a web server 351 (analogous to one or more of the webpage server(s) 151 shown in FIG. 1).

However, as shown in block 305, the web server 351 has sent the web browser 345 an error message indicating that the original webpage is no longer available.

In response to receiving the error message described in block 305, the web browser directs the search engine 346 to search for another webpage whose URL is similar to, but not exactly like, the original URL. Once the best candidate URL is located by the search engine 346, the web browser uses this best candidate URL to request the newly-identified webpage, as described in block 307.

As described in block 309, the web server 351 then returns the new webpage to the client device 301.

Figure 4:
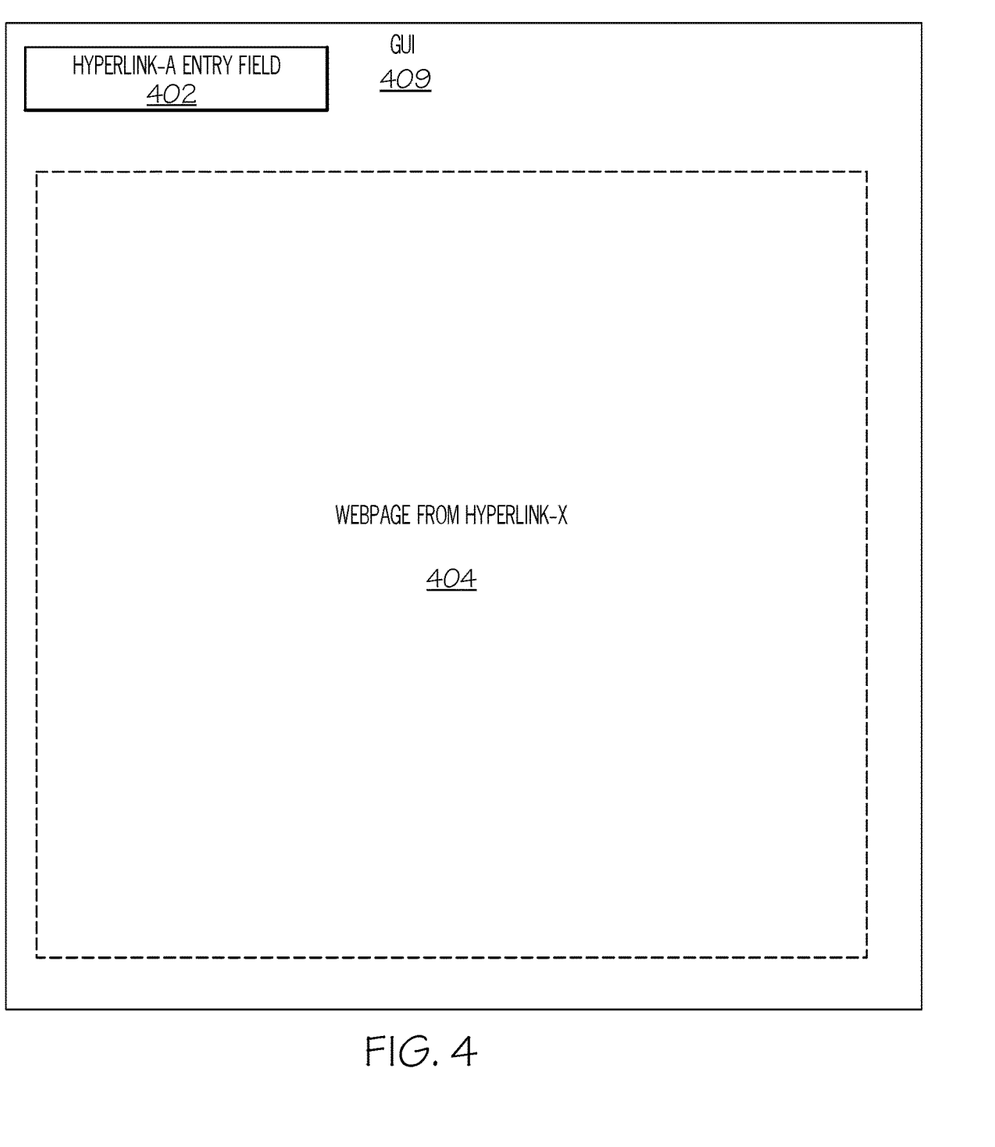
FIG. 4 illustrates a graphical user interface (GUI) being auto-populated with an alternative webpage in accordance with one or more embodiments of the present invention.

FIG. 4 illustrates a graphical user interface (GUI) being auto-populated with an alternative webpage in accordance with one or more embodiments of the present invention. As described herein, if the browser 145 (using search engine 146 shown in FIG. 1) determines that there is only one hyperlink that clearly is better suited to replace the original (failed) hyperlink (e.g., the literals in the original hyperlink more closely match the literals in the particular "winner" hyperlink as described herein), then when a user enters the original hyperlink into a Hyperlink-A entry field 402 on a graphical user interface (GUI) 409 (e.g., being displayed on a the display 109 shown in FIG. 1), then the webpage that is associated with Hyperlink-X 404 (e.g., the hyperlink whose literals have a 95% match (above the predefined 90% minimum match) to the original hyperlink, while all other hyperlinks identified by the search engine 146 only have a 70% match to the literals in the original hyperlink), then the webpage from Hyperlink-X 404 is automatically displayed on the GUI 409. However, in order to let the user know that he/she is not getting the webpage that he/she originally requested in Hyperlink-A entry field 402 (e.g., a bookmarked link, an URL entry field, etc.), but rather is getting an alternative webpage, the webpage from Hyperlink-X 404 is visually coded (e.g., color coded, shaded, given a distinctive border, etc.).

Figure 5:
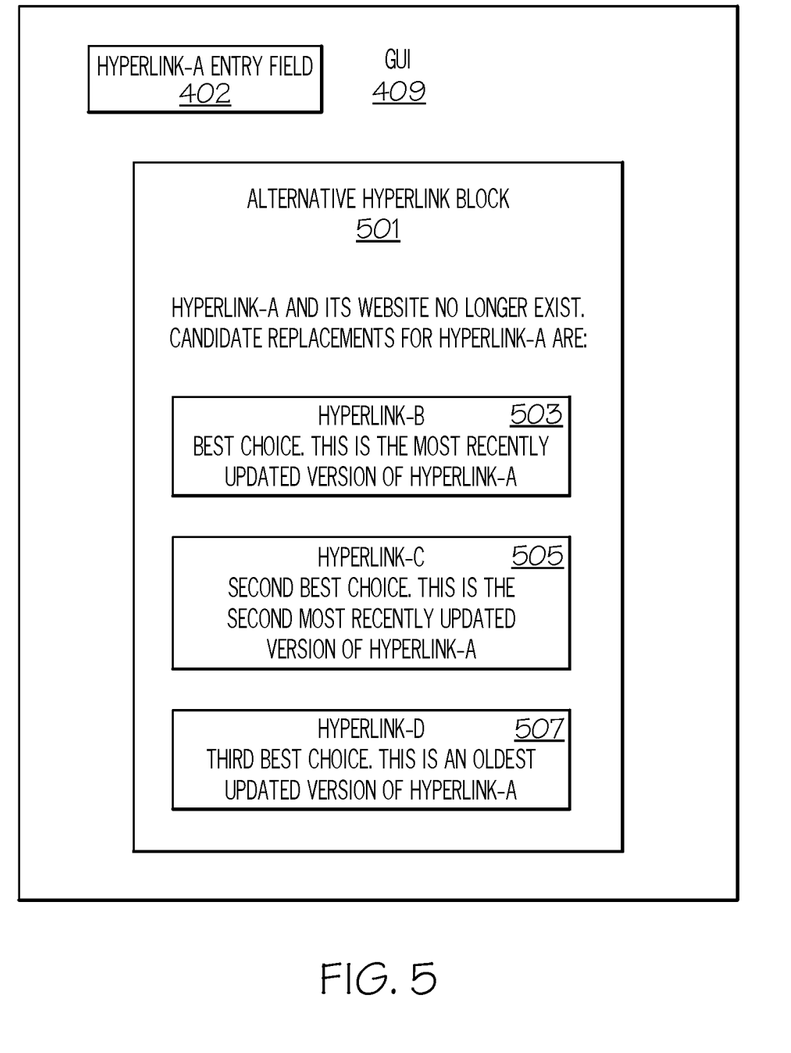
FIG. 5 depicts a GUI presenting multiple alternative webpages to a user in accordance with one or more embodiments of the present invention.

With reference now to FIG. 5, assume that the user entered the URL for the desired webpage into the Hyperlink-A entry field 402 on the GUI 409 shown in FIG. 4. However, in this embodiment, there are multiple candidate URLs for replacing the original URL, with no clear "winner". That is, either none of the candidate URL's exceed the 90% minimum match, or else they all exceed the 90% minimum match, but they are all close together (e.g., the range of matches is between 92% and 94%). As such, the system will display an alternative hyperlink block 501, which lets the user know that multiple candidate URLs/webpages have been identified as alternatives to the originally-requested webpage (as described by the entry to Hyperlink-A entry field 402). Thus, the alternative hyperlink block 501 lets the user know that Hyperlink-A (and the website associated with Hyperlink-A) no longer exist, and that the system has multiple suggested replacement hyperlinks/webpages, shown as Hyperlink-B, Hyperlink-C, and Hyperlink-D. By clicking one of the blocks 503, 505, or 507, the associated webpage will be displayed (as in FIG. 4). However, before the user selects one of the identified Hyperlinks, he/she needs more information about the differences in the different hyperlinks. The information in blocks 503, 505 and 507 explains that the webpage retrieved from executing Hyperlink-B is the best choice, since it is the most recently-updated version of Hyperlink-A. Hyperlinks C and D are older, and thus are deemed by the system to be less desirable choices, but the user may disagree. For example, the user may want a copy of a user guide that describes features that were available to a second version of a product (software, hardware, mechanical, clothing, goods, services, etc.) but are no longer available in new versions. As such, the user will select block 507, since it will have these new features and/or their description.

Figure 6:
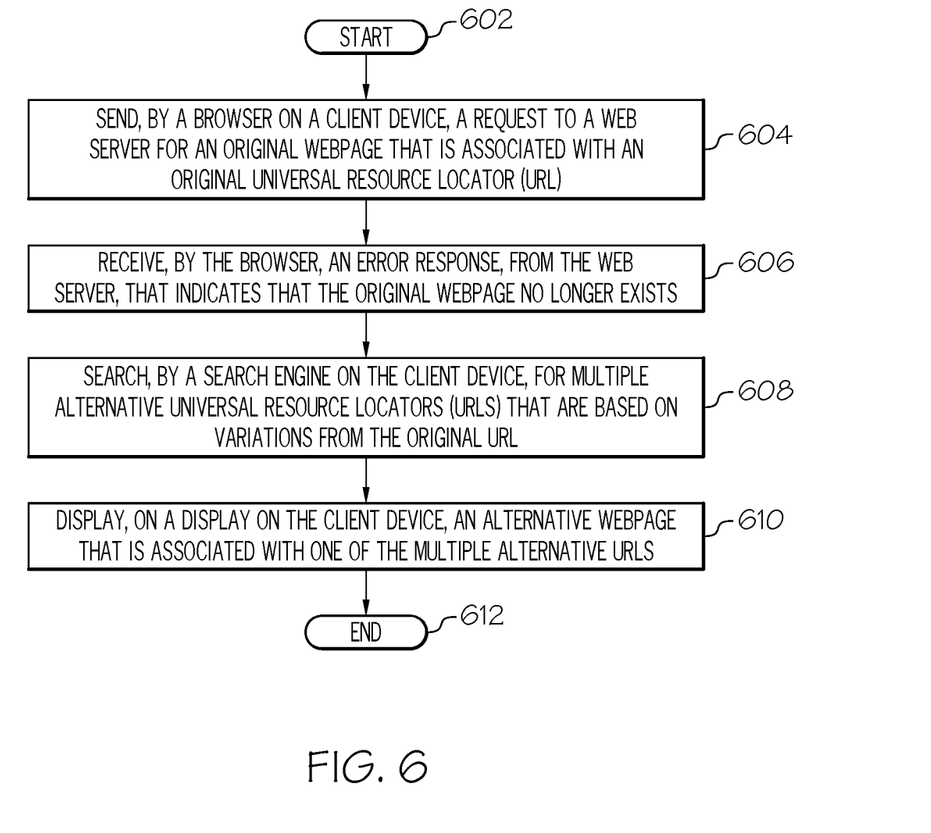
FIG. 6 is a high-level flow-chart of one or more steps performed in a processor-based method in accordance with one or more embodiments of the present invention.

With reference now to FIG. 6, a high-level flow-chart of one or more steps performed in a processor-based method in accordance with one or more embodiments of the present invention is presented.

After initiator block 602, a browser (e.g., browser 145 shown in FIG. 1) on a client device (e.g., computer 101 shown in FIG. 1) sends a request to a web server (e.g., one or more of the webpage server(s) 151 shown in FIG. 1) for an original webpage, as described in block 604. As described herein, the original webpage is associated with an original Universal Resource Locator (URL). That is, an original webpage (e.g., "Webpage A") is retrieved by entering the original URL (e.g., "URL A") into the web browser.

As described in block 606, the browser then receives an error response from the web server, which indicates that the original webpage no longer exists.

As described in block 608, a search engine (e.g., search engine 146) on the client device searches for multiple alternative Universal Resource Locators (URLs) that have been identified by the search engine. As described herein, the multiple alternative URLs are based on variations from the original URL based on different literals in the URL.

As described in block 610, an alternative webpage that is associated with one of the multiple alternative URLs is then displayed on a display on the client device.

The flow-chart of FIG. 6 ends at terminator block 612.

In an embodiment of the present invention, the client device ranks the multiple alternative URLs based on the variations from the original URL. That is, the greater the variance in the literals from the original URL, the lower the ranking of the alternative URL. The client device thus identifies a URL that is ranked higher than any other URL from the multiple alternative URLs at a predefined level. For example, one particular URL has a 95% match with the literals in the original URL, while all other candidate URLs only have less than a 75% match with the literals in the original URL. As shown in FIG. 4, a webpage that is associated with the highest ranked URL as the alternative webpage is automatically retrieved and displayed on the display on the client device.

In an embodiment of the present invention, the browser presents each of the multiple alternative URLs along with a hyperlink and a description of a website associated with each of the multiple alternative URLs, as shown in FIG. 5. The browser then receives a user selection of a particular alternative URL, from the multiple alternative URLs, that is associated with the alternative webpage. The browser then retrieves and displays a webpage that is associated with the particular alternative URL, which is selected by the user, as the alternative webpage on the client device, as shown in FIG. 4.

In an embodiment of the present invention and as shown in FIG. 4, the client device visually modifies a display of the alternative webpage in order to indicate that the alternative webpage is an alternative to the original webpage.

In an embodiment of the present invention and as described herein, the variations of the original URL are variations of a date associated with (i.e., depicted in the literals in) the original URL.

In an embodiment of the present invention and as described herein, the variations of the original URL are variations of a version number associated with (i.e., depicted in the literals in) the original URL.

As described herein, various embodiments of the present invention provide a process for identifying and retrieving replacement/alternative webpages that are substitutes for webpages that are no longer available on the web in a dynamic manner that does not require the use of a lookup page or other resources that would make for a static solution. Thus, the present invention provides a new and useful improvement over the prior art for retrieving useful webpages in a dynamic and non-limiting manner.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
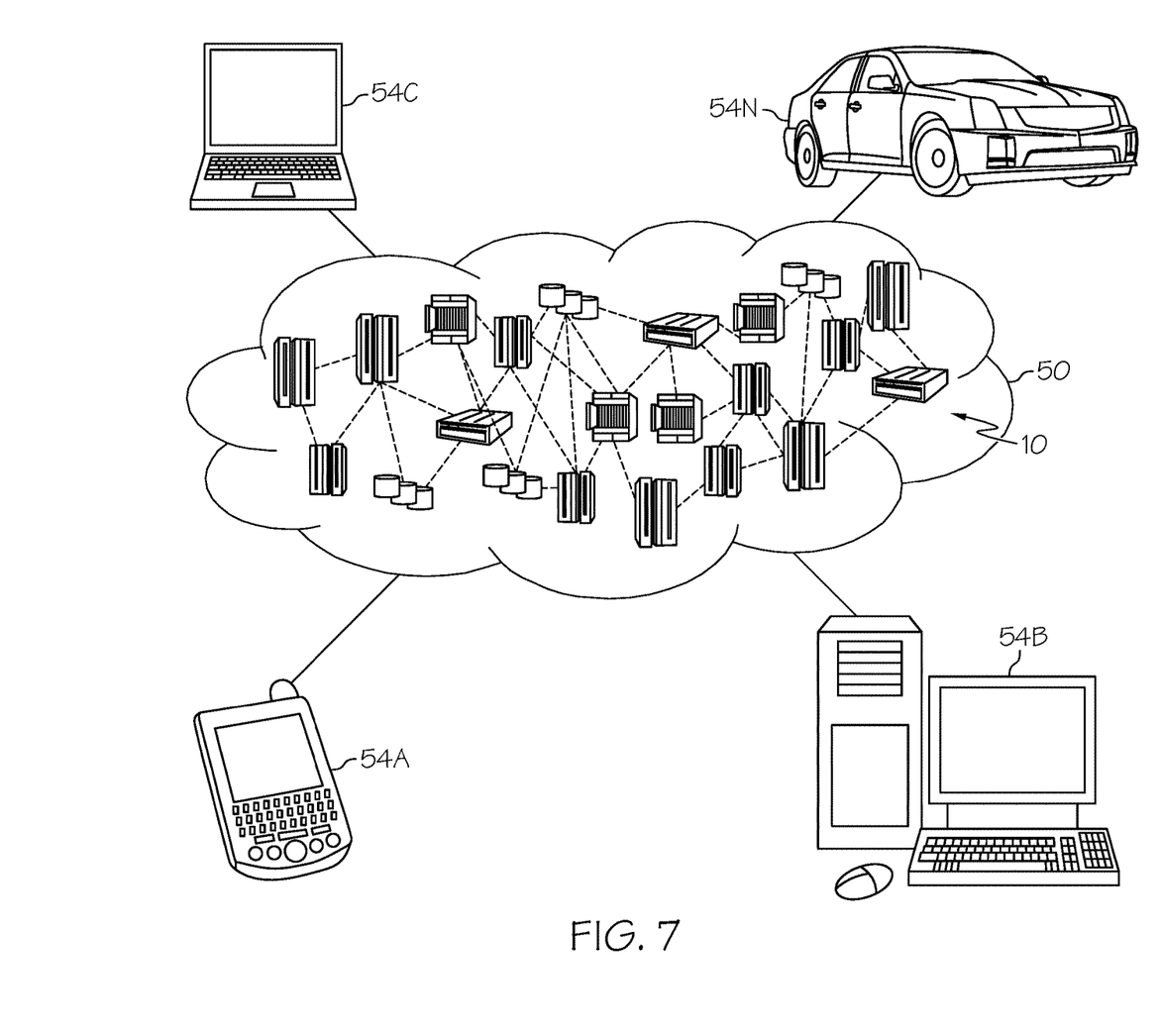
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
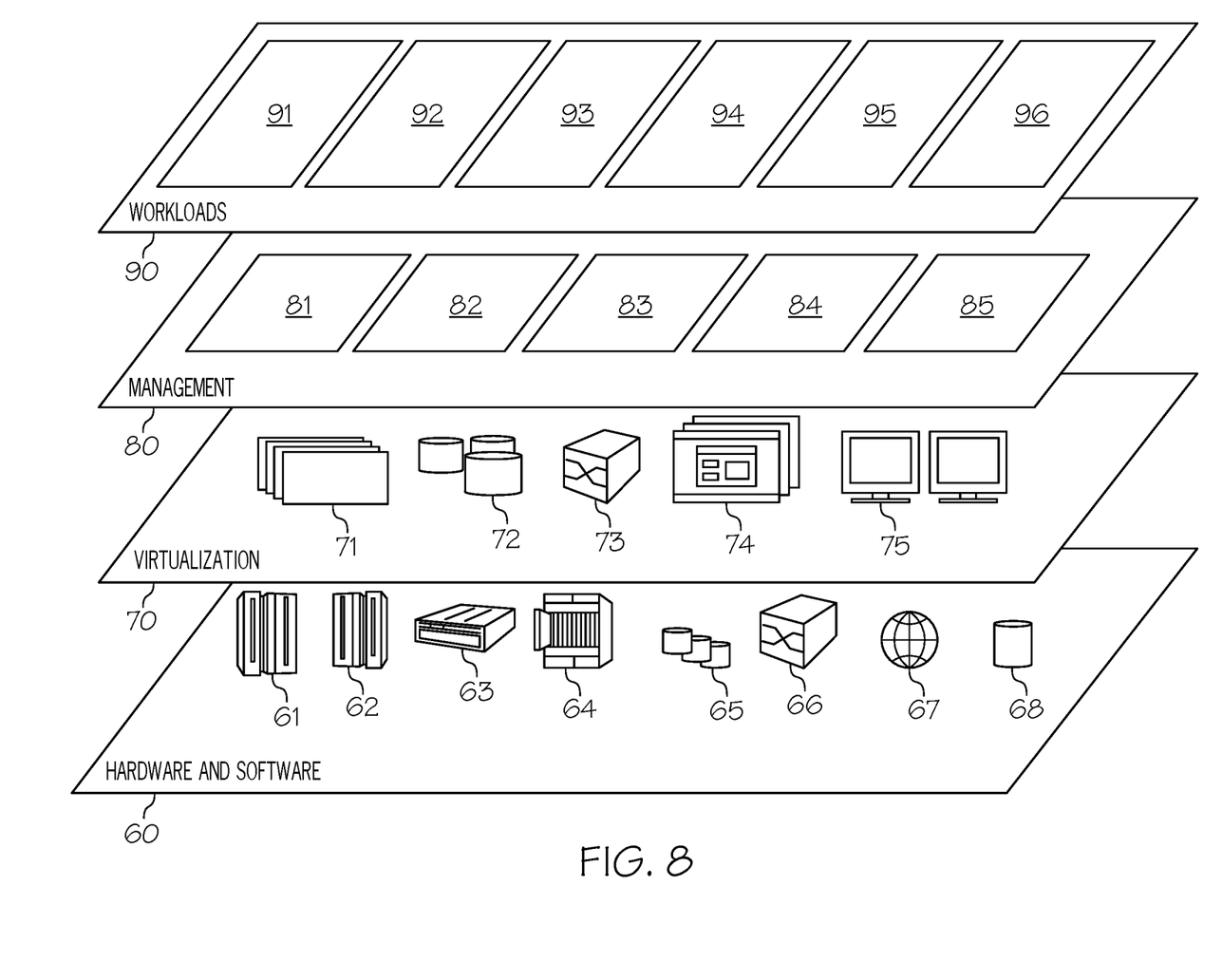
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71;

virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and webpage link correction processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    sending, by a browser on a client device, a request to a web server for an original webpage, wherein the original webpage is associated with an original Universal Resource Locator (URL);
    receiving, by the browser, an error response from the web server, wherein the error response indicates that the original webpage no longer exists;
    searching, by a search engine on the client device, for multiple alternative Universal Resource Locators (URLs), wherein the multiple alternative URLs are based on variations from the original URL;
    tokenizing the original URL to identify one or more literals in the original URL;
    comparing the one or more literals in the original URL with search results from the search engine to identify literals in the multiple alternative URLs which are in a same category as the one or more literals identified in the original URL;
    selecting the multiple alternative URLs within the search results that differ only in the identified one or more literals from the original URL;
    calculating, for each of the selected alternative URLs, a confidence level denoting a degree of similarity between the original URL and each selected alternative URL;
    identifying the selected alternative URLs that have more than a predefined value for the calculated confidence level as candidate replacement URLs; and
    displaying an alternative webpage that is associated with one of the candidate replacement URLs that has a higher confidence level than any other URL from the candidate replacement URLs.

2. The method of claim 1, further comprising:
    ranking, by the client device, the multiple alternative URLs based on the variations from the original URL;
    identifying, by the client device, a highest ranked URL that is ranked higher than any other URL from the multiple alternative URLs at a predefined level; and
    automatically retrieving and displaying, on the display on the client device, a webpage that is associated with the highest ranked URL as the alternative webpage.

3. The method of claim 1, further comprising:
    presenting, by the browser, each of the multiple alternative URLs along with a hyperlink and a description of a website associated with each of the multiple alternative URLs;
    receiving, by the browser, a user selection of a particular alternative URL from the multiple alternative URLs, wherein the particular alternative URL is associated with the alternative webpage; and
    retrieving and displaying, by the browser, a webpage that is associated with the particular alternative URL as the alternative webpage on the client device.

4. The method of claim 1, further comprising:
visually modifying, by the client device, a display of the alternative webpage in order to indicate that the alternative webpage is an alternative to the original webpage.

5. The method of claim 1, wherein the variations of the original URL are variations of a date associated with the original URL.

6. The method of claim 1, wherein the variations of the original URL are variations of a version number associated with the original URL.

7. The method of claim 1, further comprising:
utilizing, by the search engine on the client device, one or more of the one or more literals identified in the original URL as search terms in order to locate the multiple alternative URLs.

8. The method of claim 1, further comprising:
utilizing, by the search engine on the client device, one or more of the one or more literals identified in the original URL in order to locate the multiple alternative URLs;
comparing, by the client device, literals in the multiple alternative URLs to literals identified in the original URL;
identifying, by the client device, an alternative URL from the multiple alternative URLs that shares more literals with the original URL than other alternative URLs from the multiple alternative URLs; and
displaying, on the display on the client device, an alternative webpage that is associated with the alternative URL from the multiple alternative URLs that shares more literals with the original URL than other alternative URLs from the multiple alternative URLs.

9. The method of claim 1, further comprising:
utilizing, by the search engine on the client device, one or more of the one or more literals identified in the original URL in order to locate the multiple alternative URLs;
comparing, by the client device, literals in the multiple alternative URLs to literals identified in the original URL;
identifying, by the client device, a first alternative URL from the multiple alternative URLs that has more than a first predefined percentage of shared literals with the original URL;
identifying, by the client device, a second alternative URL from the multiple alternative URLs that has less than a second predefined percentage of shared literals with the original URL; and
in response to identifying the first alternative URL and the second alternative URL, automatically displaying, on the display on the client device, an alternative webpage that is associated with the first alternative URL.

10. The method of claim 1, further comprising:
utilizing, by the search engine on the client device, one or more of the one or more literals identified in the original URL in order to locate the multiple alternative URLs;
comparing, by the client device, literals in the multiple alternative URLs to literals in the original URL, wherein the literals are month literals that include names of months in a same year;
identifying, by the client device, a first alternative URL from the multiple alternative URLs that has a first month literal that describes a first month that is within a first temporal distance to an original month that is described in an original month literal in the original URL;
identifying, by the client device, a second alternative URL from the multiple alternative URLs that has a second month literal that describes a second month that is within a second temporal distance to the original month that is described in the original month literal in the original URL;
determining, by the client device, that the first temporal distance is shorter than the second temporal distance; and
in response to determining that the first temporal distance is shorter than the second temporal distance, displaying, on the display on the client device, an alternative webpage that is associated with the first alternative URL.

11. The method of claim 1, further comprising:
determining, by the client device, a confidence level for each the multiple alternative URLs, wherein the confidence level describes a confidence that each of the multiple alternative URLs provide a webpage that matches content of the original webpage;
determining, by the client device, that confidence levels for the multiple alternative URLs are within a predetermined range;
in response to determining that the confidence levels for the multiple alternative URLs are within the predetermined range, displaying, on display on the client device, the multiple alternative URLs;
receiving, by the client device, a user-selected URL from the multiple alternative URLs; and
displaying, on the display on the client device, an alternative webpage that is associated with the user-selected URL.

12. A computer program product for retrieving an alternative webpage, wherein the computer program product comprises a non-transitory computer readable storage device having program instructions embodied therewith, the program instructions readable and executable by a computer to perform a method comprising:
sending, by a browser on a client device, a request to a web server for an original webpage, wherein the original webpage is associated with an original Universal Resource Locator (URL);
receiving, by the browser, an error response from the web server, wherein the error response indicates that the original webpage no longer exists;
searching, by a search engine on the client device, for multiple alternative Universal Resource Locators (URLs), wherein the multiple alternative URLs are based on variations from the original URL;
tokenizing the original URL to identify one or more literals in the original URL;
comparing the one or more literals in the original URL with search results from the search engine to identify literals in the multiple alternative URLs which are in a same category as the one or more literals identified in the original URL;
selecting the multiple alternative URLs within the search results that differ only in the identified one or more literals from the original URL;
calculating, for each of the selected alternative URLs, a confidence level denoting a degree of similarity between the original URL and each selected alternative URL;

identifying the selected alternative URLs that have more than a predefined value for the calculated confidence level as candidate replacement URLs; and displaying an alternative webpage that is associated with one of the candidate replacement URLs that has a higher confidence level than any other URL from the candidate replacement URLs.

13. The computer program product of claim 12, wherein the method further comprises:

ranking, by the client device, the multiple alternative URLs based on the variations from the original URL;

identifying, by the client device, a highest ranked URL that is ranked higher than any other URL from the multiple alternative URLs at a predefined level; and automatically retrieving and displaying, on the display on the client device, a webpage that is associated with the highest ranked URL as the alternative webpage.

14. The computer program product of claim 12, wherein the method further comprises:

presenting, by the browser, each of the multiple alternative URLs along with a hyperlink and a description of a website associated with each of the multiple alternative URLs;

receiving, by the browser, a user selection of a particular alternative URL from the multiple alternative URLs, wherein the particular alternative URL is associated with the alternative webpage; and retrieving and displaying, by the browser, a webpage that is associated with the particular alternative URL as the alternative webpage on the client device.

15. The computer program product of claim 12, wherein the method further comprises:

visually modifying, by the client device, a display of the alternative webpage in order to indicate that the alternative webpage is an alternative to the original webpage.

16. The computer program product of claim 12, wherein the variations of the original URL are variations of a date associated with the original URL.

17. The computer program product of claim 12, wherein the variations of the original URL are variations of a version number associated with the original URL.

18. The computer program product of claim 12, wherein the program instructions are provided as a service in a cloud environment.

19. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

sending, by a browser on a client device, a request to a web server for an original webpage, wherein the original webpage is associated with an original Universal Resource Locator (URL);

receiving, by the browser, an error response from the web server, wherein the error response indicates that the original webpage no longer exists;

searching, by a search engine on the client device, for multiple alternative Universal Resource Locators (URLs), wherein the multiple alternative URLs are based on variations from the original URL; and tokenizing the original URL to identify one or more literals in the original URL;

comparing the one or more literals in the original URL with search results from the search engine to identify literals in the multiple alternative URLs which are in a same category as the one or more literals identified in the original URL;

selecting the multiple alternative URLs within the search results that differ only in the identified one or more literals from the original URL;

calculating, for each of the selected alternative URLs, a confidence level denoting a degree of similarity between the original URL and each selected alternative URL;

identifying the selected alternative URLs that have more than a predefined value for the calculated confidence level as candidate replacement URLs; and displaying an alternative webpage that is associated with one of the candidate replacement URLs that has a higher confidence level than any other URL from the candidate replacement URLs.

20. The computer system of claim 19, wherein the program instructions are provided as a service in a cloud environment.

* * * * *